(12) United States Patent
Hashimoto et al.

(10) Patent No.: US 10,475,242 B2
(45) Date of Patent: Nov. 12, 2019

(54) IMAGE DISPLAY CONTROL DEVICE AND IMAGE DISPLAY SYSTEM INCLUDING IMAGE SUPERIMPOSITION UNIT THAT SUPERIMPOSES A MIRROR IMAGE AND A VEHICLE-BODY IMAGE

(71) Applicant: AISIN SEIKI KABUSHIKI KAISHA, Kariya-shi, Aichi-ken (JP)

(72) Inventors: Yoshikuni Hashimoto, Anjo (JP); Koichiro Honda, Kiyosu (JP); Kanae Kitamura, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 118 days.

(21) Appl. No.: 15/110,024

(22) PCT Filed: Jun. 20, 2014

(86) PCT No.: PCT/JP2014/066476
§ 371 (c)(1),
(2) Date: Jul. 6, 2016

(87) PCT Pub. No.: WO2015/104860
PCT Pub. Date: Jul. 16, 2015

(65) Prior Publication Data
US 2016/0350974 A1  Dec. 1, 2016

(30) Foreign Application Priority Data
Jan. 10, 2014  (JP) .................................. 2014-003786

(51) Int. Cl.
*B60R 1/00* (2006.01)
*G06T 19/00* (2011.01)
(Continued)

(52) U.S. Cl.
CPC .............. *G06T 19/006* (2013.01); *B60R 1/00* (2013.01); *G06F 3/14* (2013.01); *G06K 9/00791* (2013.01);
(Continued)

(58) Field of Classification Search
CPC .......... B60R 2300/304; B60R 2300/60; B60R 2300/8026; B60R 2300/105;
(Continued)

(56) References Cited

U.S. PATENT DOCUMENTS 8,294,563 B2 * 10/2012 Shimoda .................. B60R 1/00
                                                340/425.5
8,878,934 B2 * 11/2014 Ikeda ....................... B60R 1/00
                                                348/148
(Continued)

FOREIGN PATENT DOCUMENTS

JP    2003-196645 A    7/2003
JP    200421307 A      1/2004
(Continued)

OTHER PUBLICATIONS

International Search Report for PCT/JP2014/066476 dated Aug. 26, 2014.

*Primary Examiner* — Jin Cheng Wang
(74) *Attorney, Agent, or Firm* — Sughrue Mion, PLLC

(57) ABSTRACT

An image display control device of an embodiment includes: a mirror image creation unit that creates a mirror image of an area behind and on the side of a vehicle body based on an image captured with an image pickup unit provided on the vehicle body; an image superimposition unit that superimposes a line drawing from which at least a lower part of the vehicle body is recognizable, and the mirror image created by the mirror image creation unit; and a display control unit that controls a display device to display an
(Continued)

image created by superimposing the mirror image and the line drawing by the image superimposition unit.

14 Claims, 14 Drawing Sheets

(51) Int. Cl.
*G09G 5/377* (2006.01)
*G06K 9/00* (2006.01)
*G06F 3/14* (2006.01)
*H04N 7/18* (2006.01)

(52) U.S. Cl.
CPC ............. *G09G 5/377* (2013.01); *H04N 7/181* (2013.01); *B60R 2300/105* (2013.01); *B60R 2300/303* (2013.01); *B60R 2300/305* (2013.01); *B60R 2300/802* (2013.01); *G09G 2380/10* (2013.01)

(58) Field of Classification Search
CPC ........ B60R 2300/303; B60R 2300/305; B60R 2300/802; G06T 11/00; G06T 19/006; G06K 9/00791; G09G 2380/10; G09G 5/00; G09G 5/36; G09G 5/377; B62D 15/0295
USPC ...... 348/148; 345/629, 633; 340/425.5, 459, 340/937; 382/104
See application file for complete search history.

(56) References Cited

U.S. PATENT DOCUMENTS

| | | | | |
|---|---|---|---|---|
| 9,288,446 | B2* | 3/2016 | Mokashi | H04N 7/18 |
| 2003/0108222 | A1 | 6/2003 | Sato et al. | |
| 2004/0119610 | A1* | 6/2004 | Maemura | B60Q 9/005 340/932.2 |
| 2004/0260469 | A1* | 12/2004 | Mizusawa | B60R 1/00 701/300 |
| 2008/0166023 | A1* | 7/2008 | Wang | G08G 1/054 382/107 |
| 2009/0066726 | A1* | 3/2009 | Kato | B60R 1/00 345/639 |
| 2009/0079553 | A1* | 3/2009 | Yanagi | B60R 1/00 340/435 |
| 2011/0025489 | A1* | 2/2011 | Shimoda | B60R 1/00 340/459 |
| 2011/0043632 | A1* | 2/2011 | Satoh | B60R 1/00 348/148 |
| 2011/0293145 | A1* | 12/2011 | Nogami | B60R 1/00 382/103 |
| 2012/0069182 | A1* | 3/2012 | Sumi | B60R 1/00 348/148 |
| 2012/0242834 | A1* | 9/2012 | Satoh | B60R 1/00 348/148 |
| 2012/0249789 | A1* | 10/2012 | Satoh | G06K 9/00832 348/143 |
| 2012/0300077 | A1* | 11/2012 | Ikeda | B60R 1/00 348/148 |
| 2013/0063601 | A1* | 3/2013 | Wakabayashi | B60R 1/00 348/148 |
| 2015/0042799 | A1* | 2/2015 | Zhang | G06K 9/00805 348/148 |
| 2015/0109446 | A1* | 4/2015 | Takano | B60R 25/10 348/148 |

FOREIGN PATENT DOCUMENTS

| | | |
|---|---|---|
| JP | 2005-184142 A | 7/2005 |
| JP | 2006-074105 A | 3/2006 |
| JP | 2009-055098 A | 3/2009 |
| JP | 2009-100180 A | 5/2009 |

* cited by examiner

IMAGE DISPLAY CONTROL DEVICE AND IMAGE DISPLAY SYSTEM INCLUDING IMAGE SUPERIMPOSITION UNIT THAT SUPERIMPOSES A MIRROR IMAGE AND A VEHICLE-BODY IMAGE

CROSS REFERENCE TO RELATED APPLICATIONS

This application is national stage application of International Application No. PCT/JP2014/066476, filed Jun. 20, 2014, which designates the United States, incorporated herein by reference, and which is based upon and claims the benefit of priority from Japanese Patent Application No. 2014-003786, filed Jan. 10, 2014, the entire contents of which are incorporated herein by reference.

TECHNICAL FIELD

The present invention relates to an image display control device and an image display system.

BACKGROUND ART

Conventionally, an image processing device for a vehicle has been known, which creates and displays an image viewed from the inside of the vehicle and containing see-through pillars.

Patent Document 1: Japanese Patent Application Laid-open No. 2003-196645

DISCLOSURE OF INVENTION

Problem to be Solved by the Invention

It is advantageous for such an image processing device to provide, for example, a novel display form that facilitates the recognition of the positional relationship between the vehicle and an object outside the vehicle.

Means for Solving Problem

An image display control device according to an embodiment includes a mirror image creation unit that creates a mirror image of an area behind and on the side of a vehicle body based on an image captured with an image pickup unit provided on the vehicle body, an image superimposition unit that superimposes a line drawing from which at least a lower part of the vehicle body is recognizable, and the mirror image created by the mirror image creation unit, and a display control unit that controls a display device to display an image created by superimposing the mirror image and the line drawing by the image superimposition unit. Thus, the present embodiment helps the occupant easily recognize, for example, the size, shape, or regions of the vehicle body on a plan view.

In the image display control device, for example, the line drawing is a line drawing from which at least a side part and a bottom part of a rear part of the vehicle body are recognizable. Thus, for example, the occupant can easily recognize the relative position of an object outside the vehicle's interior to a rear corner of the vehicle body.

In the image display control device, for example, the line drawing includes a first part showing an edge of the lower part of the vehicle body in a vehicle width direction, and a second part showing a rear edge of the lower part of the vehicle body in a vehicle longitudinal direction. Thus, for example, the occupant can easily recognize the relative position of an object outside the vehicle's interior to the vehicle body based on the edge in the vehicle width direction and rear edge in the vehicle longitudinal direction of the lower part of the vehicle body.

In the image display control device, for example, the line drawing includes a third part showing a rear edge of a side of the vehicle body in the vehicle longitudinal direction. Thus, for example, the occupant can easily recognize the relative position of an object outside the vehicle's interior to the vehicle body, or the size of the object based on a side and a rear corner of the vehicle body.

In the image display control device, for example, the line drawing includes a plurality of lines with different surface densities. Thus, for example, the occupant can easily see an object outside the vehicle's interior in the line part having a low surface density.

In the image display control device, for example, the line drawing includes a line extending in a vehicle vertical direction on the side part or rear part of the vehicle body. Thus, for example, the occupant can easily recognize the sides, rear or corners of the vehicle body using the vertically extending line.

In the image display control device, for example, the line drawing includes display elements, and either a width or an interval of the display elements becomes gradually narrower toward the rear of the vehicle body. Thus, for example, the occupant can easily recognize the depth of the vehicle body (a position in the vehicle longitudinal direction).

In the image display control device, for example, the line drawing includes a display element showing a center of the lower part of the vehicle body. Thus, for example, the occupant can easily recognize the center of the vehicle body.

In the image display control device, for example, the line drawing includes an area drawn in a frame form corresponding to the lower part of the vehicle body. Thus, for example, the occupant can easily recognize the size, shape, or regions of the lower part of the vehicle body on a plan view.

In the image display control device, for example, the line drawing includes an area drawn in a lattice pattern corresponding to the lower part of the vehicle body. Thus, for example, the occupant can easily recognize, for example, the size, shape, or regions of the lower part of the vehicle body on a plan view.

In the image display control device, for example, the line drawing is in a three-dimensional frame form. Thus, for example, the occupant can easily recognize the relative position of an object outside the vehicle's interior to the vehicle body, or the size of the object based on a component of the vehicle body.

In the image display control device, for example, the display control unit adjusts a display range of the superimposed mirror image and line drawing in accordance with a vehicle condition. Thus, for example, the occupant can easily recognize the conditions around the vehicle or outside the vehicle in travel direction.

In the image display control device, for example, the display control unit determines a display mode of the line drawing in accordance with a vehicle condition. Thus, for example, the occupant can more easily recognize the conditions around the vehicle or outside the vehicle in the travel direction.

An image display system according to an embodiment includes, for example, a first image pickup unit that is provided on a vehicle body and captures an image of an area behind the vehicle body, a second image pickup unit that is provided on the vehicle body and captures an image of an area on the side of the vehicle body, a display device, and an image display control device that includes a mirror image creation unit that creates a mirror image of an area behind and on the side of the vehicle body based on the images captured with the first image pickup unit and the second image pickup unit, an image superimposition unit that superimposes the mirror image and a vehicle-body image from which at least a lower part of the vehicle body is recognizable, and a display control unit that controls the display device to display an image created by superimposing the mirror image and the vehicle-body image by the image superimposition unit. Thus, the present embodiment helps the occupant easily recognize, for example, the size, shape, or regions of the vehicle body on a plan view.

BEST MODE(S) FOR CARRYING OUT THE INVENTION

Exemplary embodiment and exemplary variations of the present invention will be disclosed hereinafter. The configurations of the embodiments and exemplary variations and the functions and results (effects) brought by the configurations are merely examples. The present invention can be implemented with a configuration other than the configurations disclosed in the embodiments and exemplary variations. Furthermore, the present invention can provide at least one of the various effects (including secondary effects) provided by the configurations.

The embodiments disclosed hereinafter include the same or like elements. The same or like elements are provided with common reference signs and the overlapping description will be omitted hereinafter.

Embodiments

Figure 1:
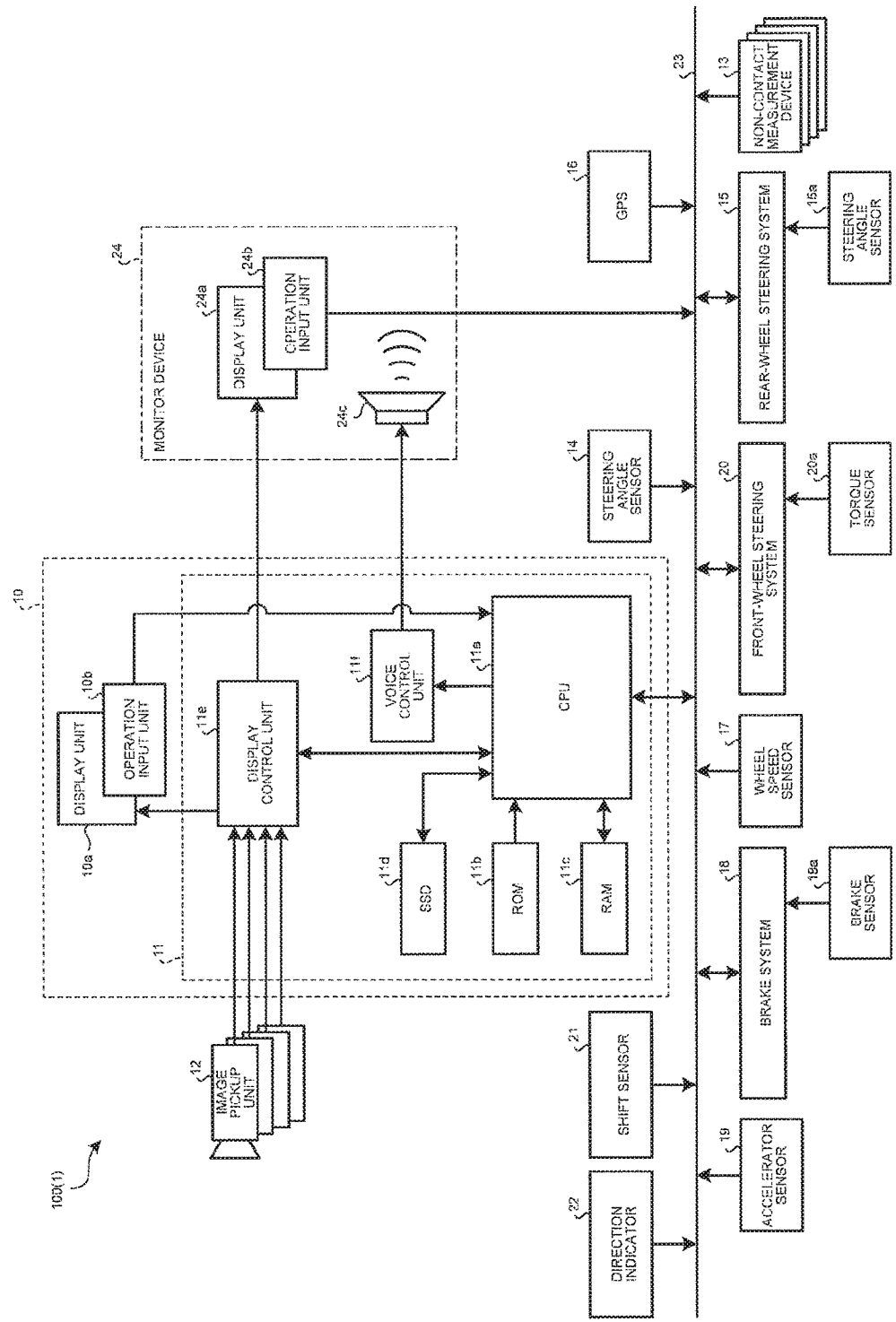
FIG. 1 is a schematic diagram of an exemplary configuration of an image display system according to an embodiment.

An image display system 100 installed on a vehicle 1 includes an electronic control unit 11 (ECU, or a display control unit, or an image display control device) that controls an image displayed on a display unit 10a (a display device) as illustrated in FIG. 1. The display unit 10a is provided, for example, in place of an interior mirror (rear-view mirror, not illustrated) provided on the front (and upper part) of the vehicle interior for viewing rearward. The display unit 10a displays an image that resembles a mirror image in the interior mirror provided on the front and upper part of the vehicle interior. An occupant can use the display unit 10a as the interior mirror or in place of the interior mirror.

When the vehicle 1 is provided with an interior mirror, the display unit 10a (a casing 10) may be attached to the interior mirror, for example, with fixing parts or an attachment to cover the mirror surface of the interior mirror. The display unit 10a displays a horizontally reverse image of the image captured with an image pickup unit 12 provided on the exterior of the vehicle (outside the vehicle's interior). The display unit 10*a* may be configured to, for example, be a liquid crystal display (LCD), an organic electro-luminescent display (OELD), or a projector. The ECU 11 can be housed in the casing 10 of the display unit 10*a*, or can be housed in another casing provided at a different location from that of the display unit 10*a*. Note that a half mirror (not illustrated) can be provided on the front surface (the rear side) of the display unit 10*a*. If such a half mirror is provided, the half mirror may be used as the interior mirror while the image display system 100 is not in use and an image is not displayed on the display unit 10*a*. Alternatively, an image pickup unit 121 (see FIGS. 3 to 6) that captures an image of the interior can be provided in the casing 10. Note that the image pickup unit 121 that captures an image of the interior is not essential. With use of the image of the interior, the image of the interior can be captured in advance and stored in a storage unit (for example, an SSD 11*d*, see FIG. 1).

Figure 2:
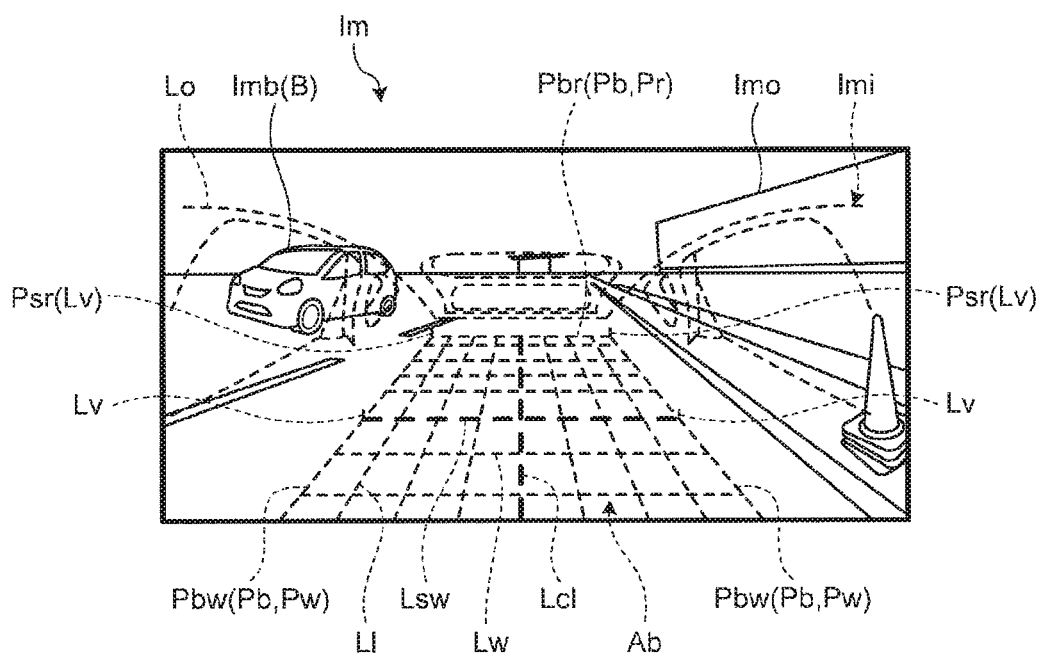
FIG. 2 is a diagram of an exemplary image (output image) displayed on the display device of the image display system of the embodiment.
Figure 3:
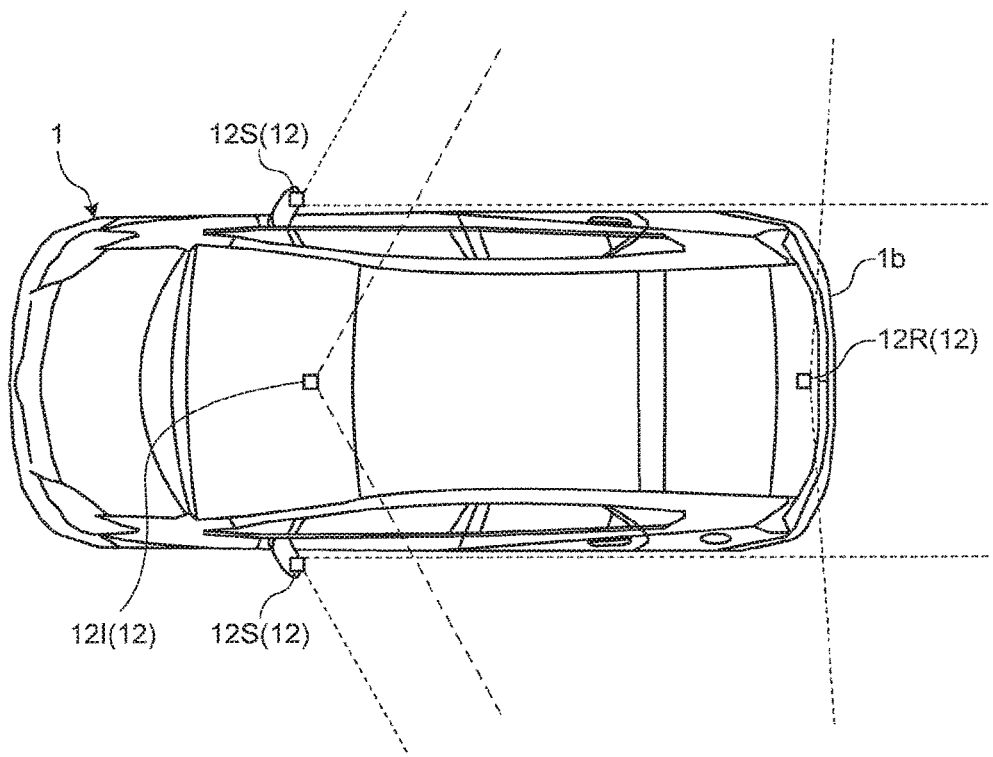
FIG. 3 is a plan view of an exemplary image pickup range of an image pickup unit of the image display system of the embodiment.
Figure 4:
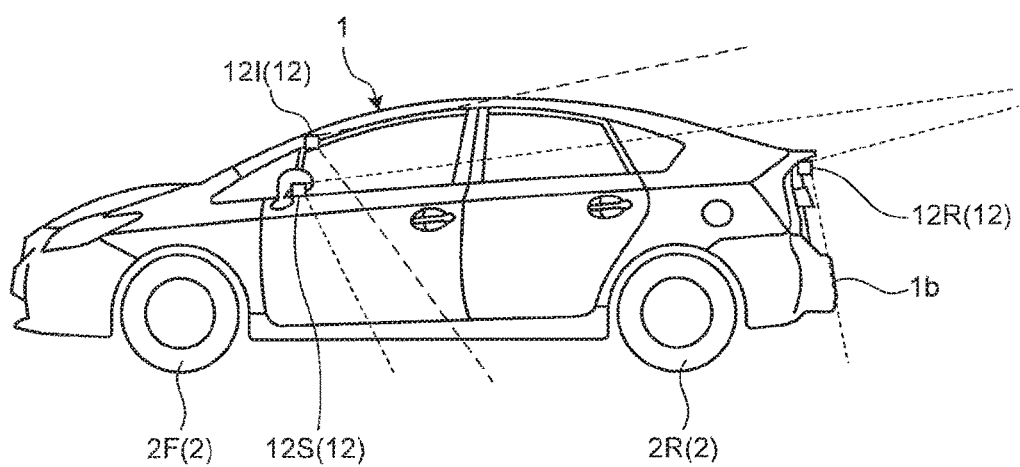
FIG. 4 is a side view of an exemplary image pickup range of the image pickup unit of the image display system of the embodiment.
Figure 5:
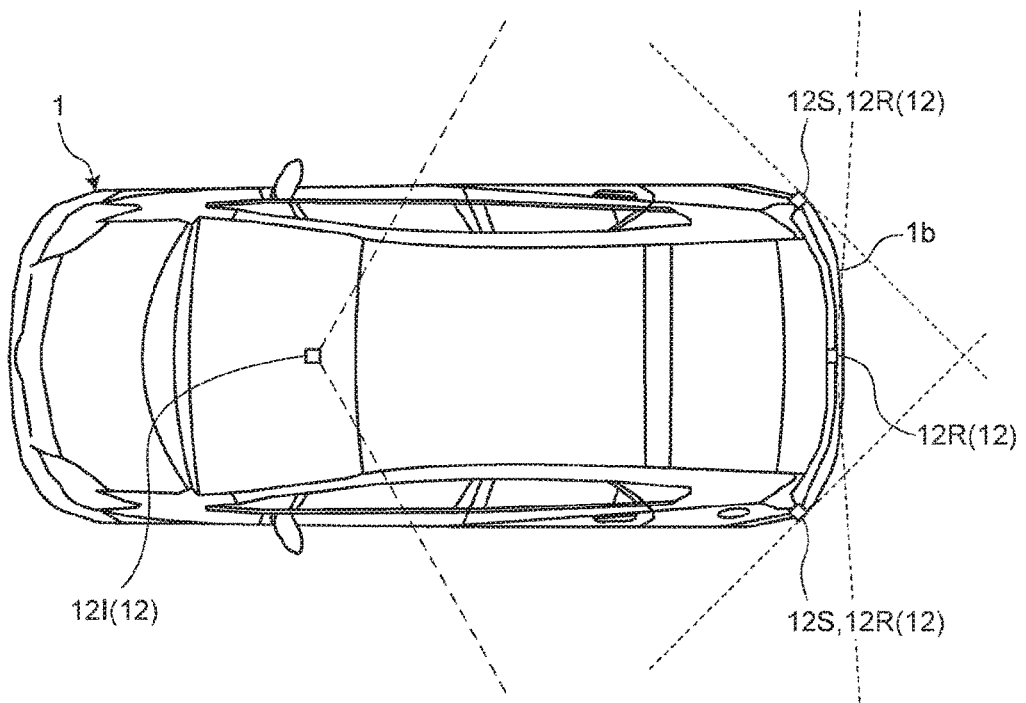
FIG. 5 is a plan view of another exemplary image pickup range of the image pickup unit of the image display system of the embodiment.
Figure 6:
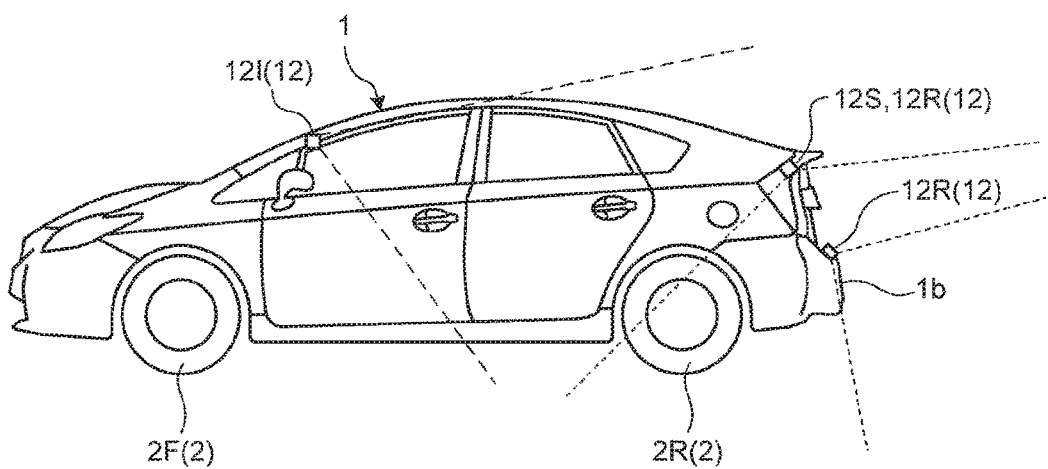
FIG. 6 is a side view of another exemplary image pickup range of the image pickup unit of the image display system of the embodiment.

The image (output image Im) on the display unit 10*a* includes, for example, an outside-vehicle image Imo (solid lines) and a vehicle-body image Imi (dashed lines) as illustrated in FIG. 2. The outside-vehicle image Imo can be generated from images captured with a plurality of image pickup units 12 on the exterior of the vehicle. The image pickup unit 12 is, for example, a digital camera incorporating an image pickup device such as a charge coupled device (CCD) or a CMOS image sensor (CIS). The image pickup unit 12 can output image data (video data or frame data) at a predetermined frame rate. As illustrated in FIGS. 3 to 6, the image pickup units 12 may include an image pickup unit 12R (a first image pickup unit) that captures an image of an area behind (the rear outside the vehicle's interior) the vehicle body (the vehicle 1), and an image pickup unit 12S (a second image pickup unit) that captures an image of an area on the side (a side outside the vehicle's interior) of the vehicle body. Each of the image pickup units 12R and 12S can image the rear and the side of the vehicle body. The image pickup unit 12 can be a wide-angle lens (a fish-eye lens). The ECU 11 can provide a series of outside-vehicle images Imo (a panoramic image, see FIG. 7) by synthesizing (combining or connecting) the images captured with the image pickup units 12 by a publicly known technique. In the present embodiment, for example, the image pickup units 12 on the exterior of the vehicle capture images of a relatively wide range of the rear and sides outside the vehicle 1 so that the display unit 10*a* can display the outside-vehicle image Imo of each point in the relatively wide range. Then, a part of the wide range (see FIG. 8) is used for a composite image (an output image Im). In the example of FIGS. 3 and 4, the image pickup units 12 on the exterior of the vehicle are provided on both sides of the vehicle 1 (the vehicle body) (for example, on the right and left side-view mirrors), and a rear edge 1*b* of the vehicle 1, respectively. Alternatively, in the example of FIGS. 5 and 6, the image pickup units 12 on the exterior of the vehicle are provided on both sides of the rear edge 1*b* of the vehicle 1 (for example, relatively high positions of the rear corners of the vehicle 1), and on the rear edge 1*b* of the vehicle 1, respectively. Furthermore, the image pickup units 12 can have vertically different image pickup ranges. Note that, needless to say, the outside-vehicle image Imo can be based on an image captured with one image pickup unit 12 or a part of the image. For example, in FIG. 2, in order to distinguish from the outside-vehicle image Imo in the drawing, the vehicle-body image Imi is illustrated by dashed lines for the sake of simplicity. The actual vehicle-body image Imi is not limited to the representation by a dashed line.

Figure 9:
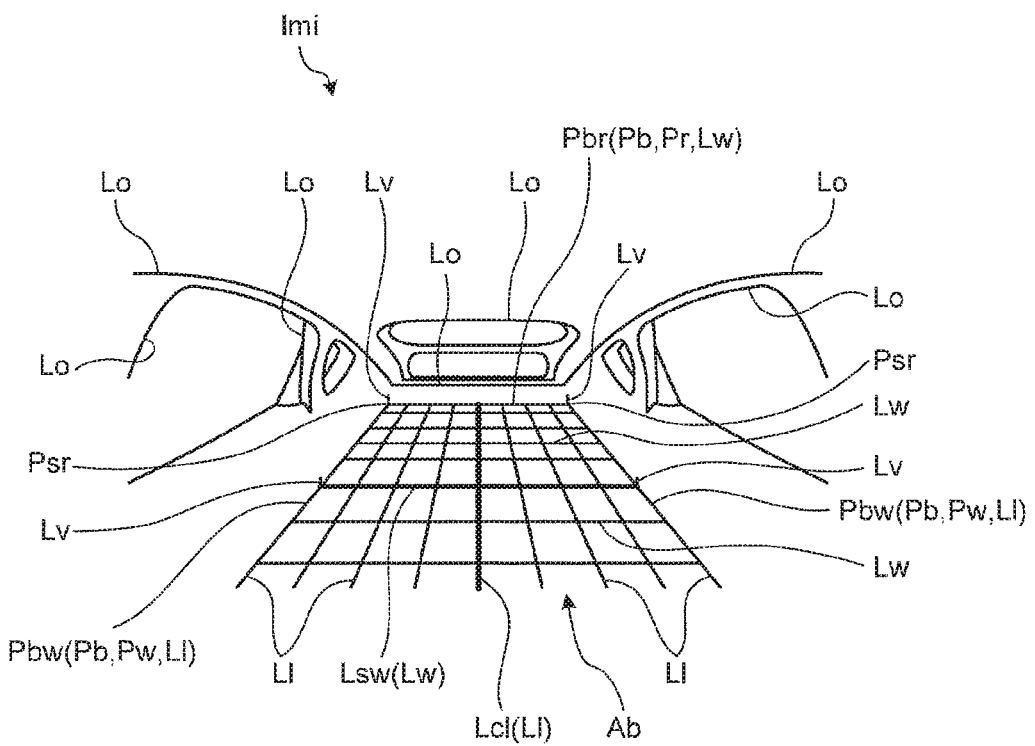
FIG. 9 is a diagram of an exemplary line drawing displayed on the display device of the image display system of the embodiment.

The vehicle-body image Imi includes a three-dimensional frame-like outline Lo (displayed element) showing the structure of the vehicle body as illustrated in the examples of FIGS. 2 and 9. The structure illustrated by the outline Lo (components of the vehicle body) includes, for example, the corners, edges, windows, pillars, doors, floor, ceiling, trim, wheels, axles, and differential gears of the vehicle body. The vehicle-body image Imi does not need to be exactly the same as the actual shape of the vehicle body as long as the occupant (driver) can generally recognize the position or shape of the vehicle body (the vehicle 1). The vehicle-body image Imi can be schematic.

The vehicle-body image Imi is displayed together with the outside-vehicle image Imo on the display unit 10*a*. This helps the occupant easily recognize, for example, the relative position (for example, distance or direction) between an object B (see FIGS. 2 and 14) outside the vehicle and the vehicle body (the vehicle 1), or the size of the object B. The vehicle-body image Imi further includes parts Pw showing the edges of the vehicle body (the vehicle 1) in the vehicle width direction, a part Pr showing the rear edge of the vehicle body, and a part Pb showing the lower part of the vehicle body as illustrated in FIGS. 2 and 9. The vehicle-body image Imi further includes, for example, parts Pbw (first parts) showing the edges of the lower part of the vehicle body in the vehicle width direction, a part Pbr (a second part) showing the rear edge of the lower part of the vehicle body in the vehicle longitudinal direction, parts Psr (third parts) showing the rear edges of both sides of the vehicle body in the vehicle longitudinal direction. The characteristic of each of the parts helps the occupant (driver) easily recognize, for example, the distance and direction of an object B of which image is included in the outside-vehicle image Imo relative to the vehicle body, or the size of the object B. Furthermore, the vehicle-body image Imi is created so that at least the lower part of the vehicle body can be recognized on a plan (two-dimensional) view. This helps the occupant easily recognize, for example, the size, shape, and regions of the vehicle body on a plan view. This also helps the occupant easily recognize, for example, the horizontal positional relationship with the object B outside the vehicle's interior based on the vehicle-body image Imi, and also helps the occupant easily recognize, for example, the height of the object B outside the vehicle's interior.

The vehicle-body image Imi is a line drawing (line diagram) as illustrated in FIGS. 2 and 9. The lines (display element) of the line drawing can be displayed in various modes. The display modes include, for example, types, surface densities, widths (thicknesses), concentrations, transmittances, colors, and patterns. For example, the types include a solid line, a dashed line, an alternate long and short dash line, an alternate long and two short dashes line, a polygonal line, a zigzag line, and a wave line. The surface density represents density per unit area of a screen (image). For example, with the same thickness, a solid line has a higher surface density than a dashed line. The line drawing may include a plurality of lines displayed in locally different modes. The line drawing may partially include a point, a symbol, a character, and a figure. The display modes of the line drawing (line diagram) may be adjusted (changed) depending on condition of the vehicle (for example, running condition or operating condition).

The vehicle-body image Imi is pre-stored in a non-volatile storage unit (for example, SSD 11*d*, see FIG. 1). The storage unit may store the vehicle-body image Imi for each vehicle model. In such a case, a composite image is created from the vehicle-body images Imi selected depending, for example, on the model of the vehicle 1 or a user's taste. The ECU 11 can transform the vehicle-body image Imi in accordance, for example, with an input instruction (operation) to the operation input unit 10b during setting operation such as calibration. Specifically, for example, the vehicle-body image Imi is transformed or changed in position, such that the vehicle-body image Imi is gradually laterally extended toward the upper side or longitudinally extended, or laterally and/or longitudinally reversed. The changed vehicle-body image Imi is then stored in the storage unit. The changed vehicle-body image Imi is used for a composite image.

Figure 13:
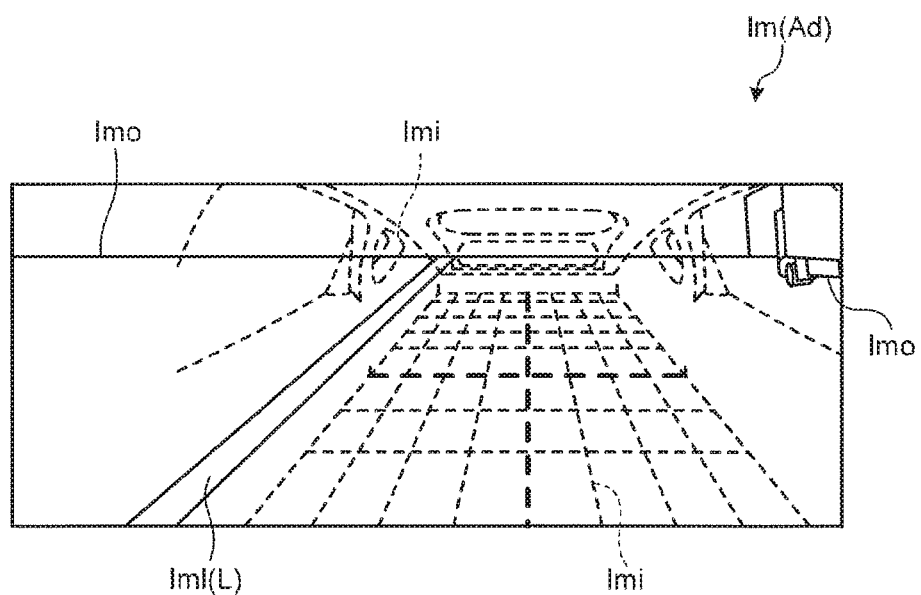
FIG. 13 is a diagram of an exemplary image (output image) during the lane change, displayed on the display device of the image display system of the embodiment.
Figure 14:
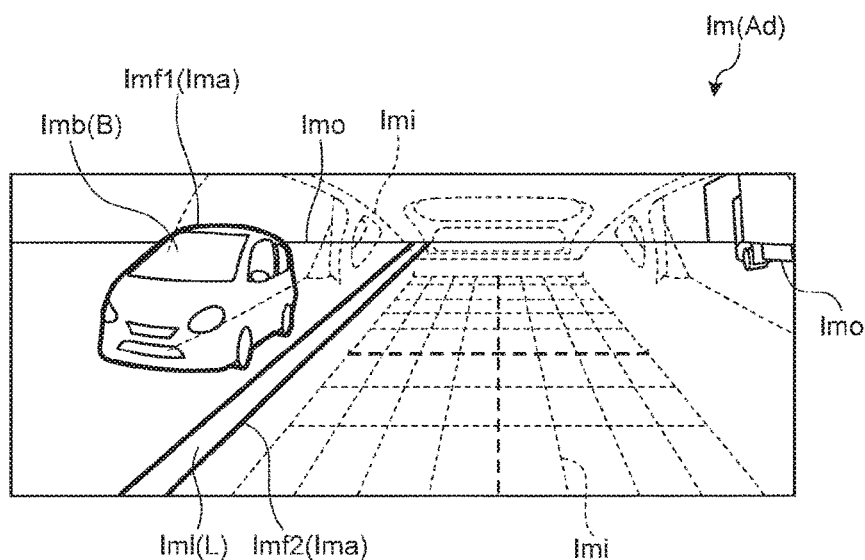
FIG. 14 is a diagram of an exemplary image (output image) displayed on the display device of the image display system of the embodiment when an object is detected outside the vehicle during the lane change.

The ECU 11 can change the transmittance α (composite ratio) of the vehicle-body image Imi as illustrated in FIGS. 13 and 14. FIG. 13 illustrates a composite image (the output image Im) including a vehicle-body image Imi represented by thick lines while FIG. 14 illustrates a composite image (the output image Im) including a vehicle-body image Imi represented by thinner lines than in FIG. 13. As a relatively simple example, when the outside-vehicle image Imo is aligned with the vehicle-body image Imi, and the vehicle-body image Imi has a luminance x1, the outside-vehicle image Imo has a luminance x2, and the transmittance is α ($0 \leq \alpha \leq 1$) at each point, the luminance x at each overlapping point of the composite image can be expressed as $x=(1-\alpha) \times x1+\alpha \times x2$. Note that the transmittance α can be set at an arbitrary value.

Figure 7:
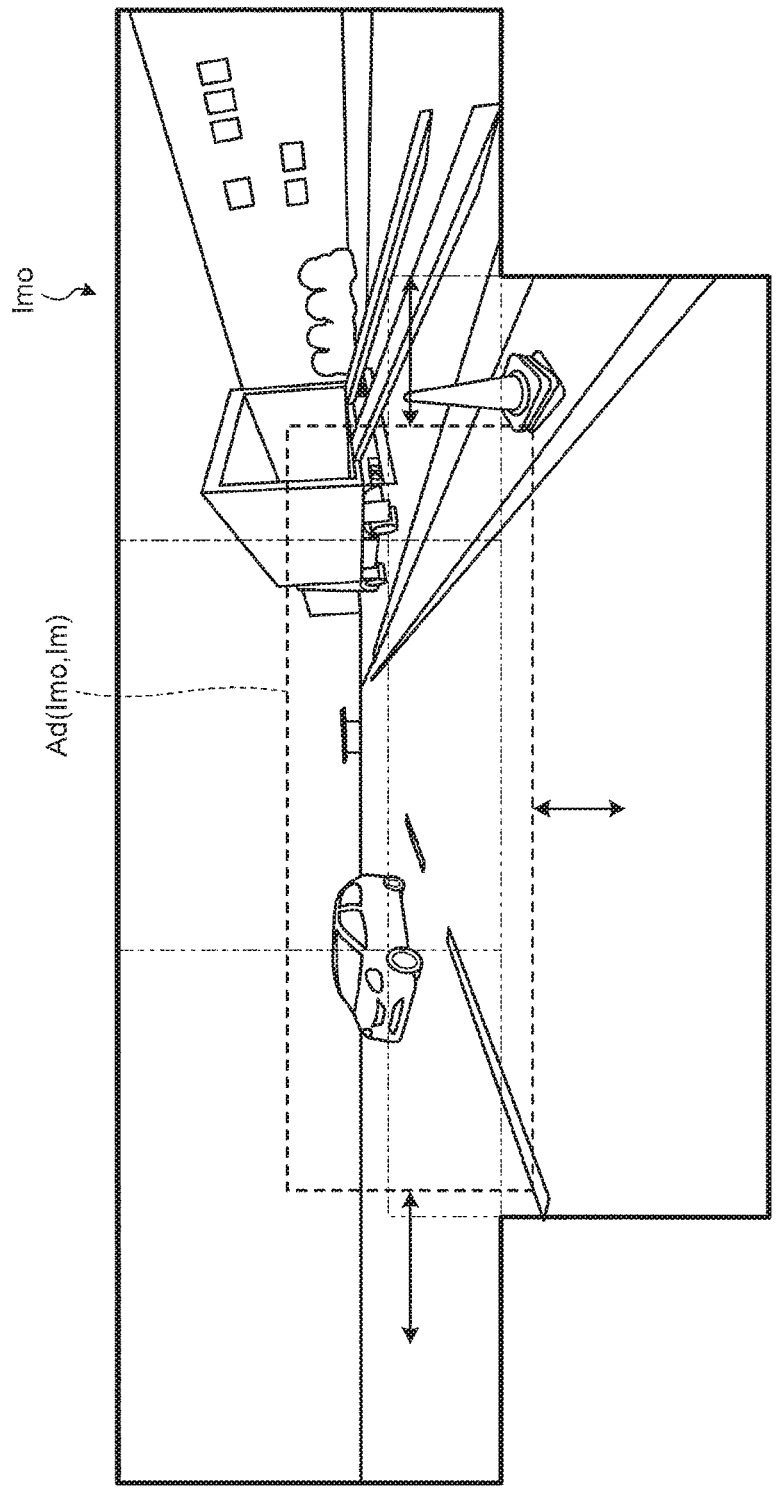
FIG. 7 is an explanatory diagram of an example of the entire outside-vehicle image obtained by the image display system of the embodiment and the display ranges.
Figure 8:
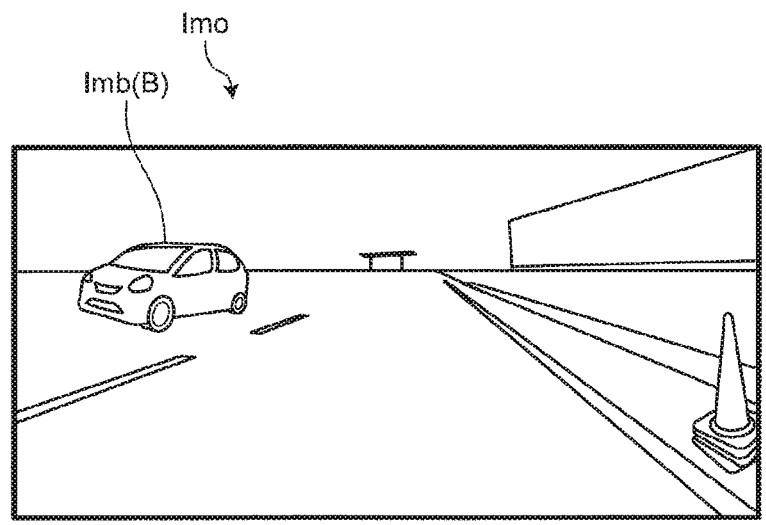
FIG. 8 is a diagram of an exemplary display range of the outside-vehicle image obtained by the image display system of the embodiment.

The ECU 11 can change a display range Ad of the composite image (the output image Im and the outside-vehicle image Imo). For example, as illustrated in FIG. 7, the ECU 11 can determine (move) the display range Ad from the outside-vehicle images Imo in the relatively wide range captured with the image pickup units 12.

The ECU 11 can change the display range Ad depending on the situation of the vehicle 1. The ECU 11 can use the results of detection from various sensors as the trigger (signal or data) for changing the display range Ad. Specifically, for example, the ECU 11 can change the transmittance α or the display range Ad in accordance with results of detection, signals, or data acquired, for example, from a non-contact measurement device 13, a steering angle sensor 14 (for the front wheels), a steering angle sensor 15a of a rear-wheel steering system 15, a global positioning system (GPS) 16, a wheel speed sensor 17, a brake sensor 18a of a brake system 18, an accelerator sensor 19, a torque sensor 20a of a front-wheel steering system 20, a shift sensor 21, and a direction indicator 22 as illustrated in FIG. 1, in accordance with instruction signals (control signals, switching signals, operation signals, input signals, data) from an operation input unit 24b (a monitor device 24), in accordance with results of detection from an object detection unit 111 (see FIG. 10), or in accordance with the position of the vehicle 1 acquired with a vehicle position acquisition unit 113 (see FIG. 10). As illustrated in FIG. 1, the electric parts or components of the image display system 100 (or the non-contact measurement device 13, the steering angle sensor 14, the steering angle sensor 15a, the GPS 16, the wheel speed sensor 17, the brake sensor 18a, the accelerator sensor 19, the torque sensor 20a, the shift sensor 21, the direction indicator 22, and the operation input unit 24b) may be electrically connected to each other, for example, via an in-vehicle network 23 (for example, a controller area network (CAN)). The electric parts or components can be electrically connected via a network other than the CAN.

The non-contact measurement device 13 (a ranging unit, or an object detection device) is, for example, a sonar (a sonar sensor or an ultrasound detector) or radar that emits ultrasound or a radio wave and catches a returning wave. The ECU 11 can measure the presence or absence of the object B (an obstacle, see FIGS. 2 and 14) located around the vehicle 1 or the distance to the object B in accordance with the detection results from the non-contact measurement device 13. In other words, the non-contact measurement device 13 is an exemplary object detection unit.

The steering angle sensor 14 is a sensor that detects the amount of steering (turning angle) of the steering unit (for example, a steering wheel, not illustrated). The steering angle sensor 14 is made of, for example, a hall element. The steering angle sensor 15a is a sensor that detects the amount of steering (turning angle) of rear wheels 2R (see FIG. 4). The steering angle sensor 15a is made of, for example, a hall element.

The wheel speed sensor 17 is a sensor that detects the rotation amount or the revolving speed per unit time of wheels 2 (front wheels 2F or rear wheels 2R, see FIG. 4). The wheel speed sensor 17 is made of, for example, a hall element. The ECU 11 can calculate, for example, the travel distance of the vehicle 1 in accordance with data from the wheel speed sensor 17. The wheel speed sensor 17 may be provided in the brake system 18.

The brake system 18 is, for example, an anti-lock brake system (ABS) that prevents the brake from locking up, an antiskid brake system (or an electronic stability control (ESC)) that prevents the vehicle 1 from skidding when cornering, an electric brake system that enhances braking force (performs braking assistance), or a brake by wire (BBW) system. The brake system 18 gives the wheels 2 (the vehicle 1) braking force through an actuator (not illustrated). The brake sensor 18a is a sensor that detects the operation of a brake pedal.

The accelerator sensor 19 is a sensor that detects the operation of an accelerator pedal. The torque sensor 20a detects the torque from the steering unit provided by the driver. The shift sensor 21 is, for example, a sensor (switch) that detects the positions of movable components (including a lever, an arm, and a button, not illustrated) of a gear shift unit. The shift sensor 21 is made of, for example, a displacement sensor. Note that the configuration, placement, or type of electrical connection of each sensor or actuator is merely an example, and can be variously set (changed). The direction indicator 22 outputs a signal to instruct a light to turn on (blink) for indicating a direction.

The display unit 10a is covered with a transparent operation input unit 10b (for example, a touch panel). For example, the occupant can view a video (image) on a display screen of the display unit 10a through the operation input unit 10b. For example, the occupant can perform various operation inputs (instructional inputs) to the image display system 100 by operating with a finger, for example, touching, pressing, or moving the operation input unit 10b at a position corresponding to the video (image) on the display screen of the display unit 10a, for example.

In addition to the display unit 10a, a display unit 24a and a voice output device 24c are provided inside the vehicle. The display unit 24a is, for example, an LCD, or an OELD. The voice output device 24c is, for example, a loudspeaker. The display unit 24a is covered with a transparent operation input unit 24b (for example, a touch panel). For example, the occupant can view a video (image) on a display screen of the display unit 24a through the operation input unit 24b. For example, the occupant can perform various operation inputs (instructional inputs) by operating with a finger, for example, touching, pressing, or moving the operation input unit 24b at a position corresponding to the video (image) on the display screen of the display unit 24a, for example. The display unit 24a, the operation input unit 24b, the voice output device 24c, and the like are provided in the monitor device 24 placed at the center of a dashboard in the vehicle width direction (lateral direction). The monitor device 24 can include an operation input unit (not illustrated) such as a switch, a dial, a joystick, or a push button. The monitor device 24 may be used also as a navigation system or an audio system. Note that the same image can be displayed on the display unit 10a and the display unit 24a of the monitor device 24.

The ECU 11 includes, for example, a central processing unit (CPU) 11a, a read only memory (ROM) 11b, a random access memory (RAM) 11c, the solid state drive (SSD) 11d (a flash memory), a display control unit 11e, and a voice control unit 11f. The CPU 11a can execute various types of calculation. The CPU 11a can read a program stored (installed) in a non-volatile storage unit such as the ROM 11b or the SSD 11d, and perform arithmetic processing in accordance with the read program. The RAM 11c temporarily stores various types of data used for the calculation in the CPU 11a. The SSD 11d is a rewritable non-volatile storage unit and can store data even when the ECU 11 is powered off. The display control unit 11e mainly performs, for example, an image processing to image data captured with the image pickup unit 12, or an image processing (for example, superimposition) to image data displayed on the display unit 10a or 24a among the arithmetic processing performed by the ECU 11. The voice control unit 11f mainly processes, for example, voice data output from the voice output device 24c among the arithmetic processing performed by the ECU 11. Note that the CPU 11a, the ROM 11b, the RAM 11c, and the like can be integrated in a package. The ECU 11 can include another logic operation processor such as a digital signal processor (DSP) or a logic circuit instead of the CPU 11a. A hard disk drive (HDD) can be provided instead of the SSD 11d. The SSD 11d or the HDD can be provided separately from the ECU 11.

In the present embodiment, for example, through the image processing by the ECU 11, the display unit 10a displays the output image Im that corresponds to (resembles, fits, matches, or is aligned with) the mirror image (map) in the interior mirror. In such a case, for example, the functions (a conversion equation or a conversion matrix), coefficients, constants, and data for coordinate conversion from the outside-vehicle image Imo (including a composite image of a plurality of images) to the output image Im corresponding to the map of the interior mirror can be found by actually acquiring the positions of a plurality markers actually placed on the exterior and interior of the vehicle in the map of the interior mirror (by calibration by taking an image), or by performing geometric calculation. For example, the synthesized position (output position), size, or shape of the vehicle-body image Imi can also be found by actually acquiring the positions of a plurality markers actually placed on the exterior and interior of the vehicle in the map of the interior mirror (by calibration by imaging), or by geometric calculation.

Figure 10:
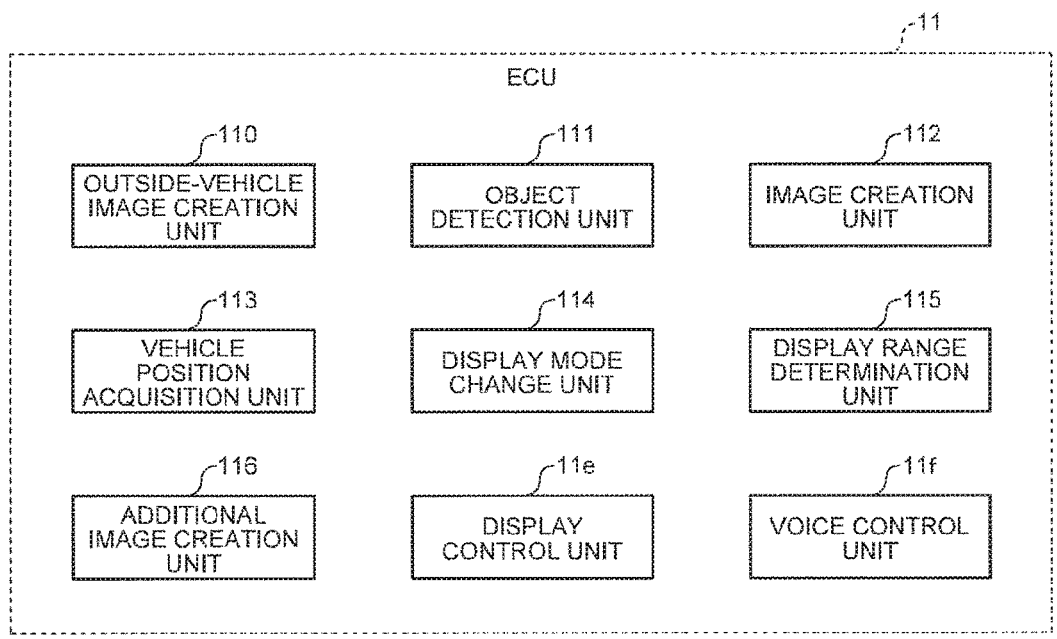
FIG. 10 is an exemplary functional block diagram of a control unit included in the image display system of the embodiment.

In the present embodiment, for example, the ECU 11 functions (operates) as at least a part of the image display control device in cooperation with hardware and software (programs). In other words, in the present embodiment, as illustrated in FIG. 10, the ECU 11 functions (operates) not only as the display control unit 11e (see FIG. 1) and the voice control unit 11f (see FIG. 1) but also as an outside-vehicle image creation unit 110, an object detection unit 111, an image creation unit 112, the vehicle position acquisition unit 113, a display mode change unit 114, a display range determination unit 115, and an additional image creation unit 116. Note that the program can include, for example, modules corresponding to the respective blocks illustrated in FIG. 10. The image processing can be performed not only by the display control unit 11e but also by the CPU 11a. The outside-vehicle image creation unit 110 is an exemplary mirror image creation unit. The image creation unit 112 is an exemplary image superimposition unit.

The outside-vehicle image creation unit 110 creates a series of outside-vehicle images Imo (a panoramic image) by overlaying (synthesizing) the boundaries of a plurality of (for example, three in the present embodiment) images captured with the image pickup units 12 on the exterior of the vehicle and connecting the images. Meanwhile, the outside-vehicle image creation unit 110 creates an outside-vehicle image Imo that resembles the mirror image (map) in the interior mirror viewed by the occupant (user or driver), for example, by converting the coordinates of the image captured with the image pickup unit 12 or the synthesized image. Note that, in order to align the images, the coordinates of the outside-vehicle image Imo captured with the image pickup unit 12 is converted to the coordinates corresponding to the vehicle-body image Imi in accordance, for example, with experimental results acquired in advance. The size of the image Imb of the object B in the outside-vehicle image Imo can be corrected based on a measured distance to the object B from the non-contact measurement device 13. Note that the outside-vehicle image Imo does not need to be completely aligned with the mirror image in the interior mirror as long as it does not give the occupant (driver) the sense of strangeness (greatly).

The object detection unit 111 detects the object B (for example, a vehicle or a person) outside the vehicle, for example, by processing the outside-vehicle image Imo (for example, the outside-vehicle image Imo created with the outside-vehicle image creation unit 110). For example, pattern matching may be used to detect the object B. The object detection unit 111 can detect the object B outside the vehicle from the data from the non-contact measurement device 13 or from the processed outside-vehicle image Imo and the data from the non-contact measurement device 13. Alternatively, the object detection unit 111 can acquire the distance from the vehicle 1 to the object B from the processed outside-vehicle image Imo or the data from the non-contact measurement device 13.

The image creation unit 112 creates the output image Im including the composite image of the superimposed vehicle-body image Imi and outside-vehicle image Imo at least for the display range Ad displayed on the display unit 10a. Note that the image creation unit 112 can further synthesize, with the output image Im, an interior image (an image or a vehicle-body image) by the image pickup unit 121 (see FIGS. 3 to 6) that captures an image of the vehicle's interior. In this case, for example, an interior image with the windows removed by image processing may be superimposed as a transparent image.

The vehicle position acquisition unit 113 can acquire the position of the vehicle 1, for example, from the data from the GPS 16, the detection results from the non-contact measurement device 13, the wheel speed detected by the wheel speed sensor 17, the steering angles detected by the steering angle sensors 14 and 15a, or the processed image of the outside-vehicle image Imo captured with the image pickup unit 12.

The display mode change unit 114 can change the display mode of at least one of the vehicle-body image Imi and the outside-vehicle image Imo in accordance, for example, with: the detection results, signals, or data from the non-contact measurement device 13, the steering angle sensors 14 and 15a, the GPS 16, the wheel speed sensor 17, the brake sensor 18a, the accelerator sensor 19, the torque sensor 20a, the shift sensor 21, and the direction indicator 22; the instruction signals, for example, from the operation input unit 24b; the detection results from the object detection unit 111; the position of the vehicle 1 acquired by the vehicle position acquisition unit 113; or the information indicating the vehicle condition. The display mode change unit 114 can change, for example, the transmittance α, brightness (luminance), or color of the vehicle-body image Imi. As for the composite image containing an interior image, the display mode change unit 114 can change, for example, the transmittance of the interior image.

The display range determination unit 115 can change the display range Ad in accordance, for example, with: the detection results, signals, or data from the non-contact measurement device 13, the steering angle sensors 14 and 15a, the GPS 16, the wheel speed sensor 17, the brake sensor 18a, the accelerator sensor 19, the torque sensor 20a, the shift sensor 21, and the direction indicator 22; the instruction signals, for example, from the operation input unit 24b; the detection results from the object detection unit 111; or the position of the vehicle 1 acquired by the vehicle position acquisition unit 113.

The additional image creation unit 116 can add, for example, an additional image Ima (an artificial image, for example, emphatic display (for example, a frame) of the object detected by the object detection unit 111 or display of lines of traffic lanes or parking lots (for example, lines)) to the output image Im.

Figure 11:
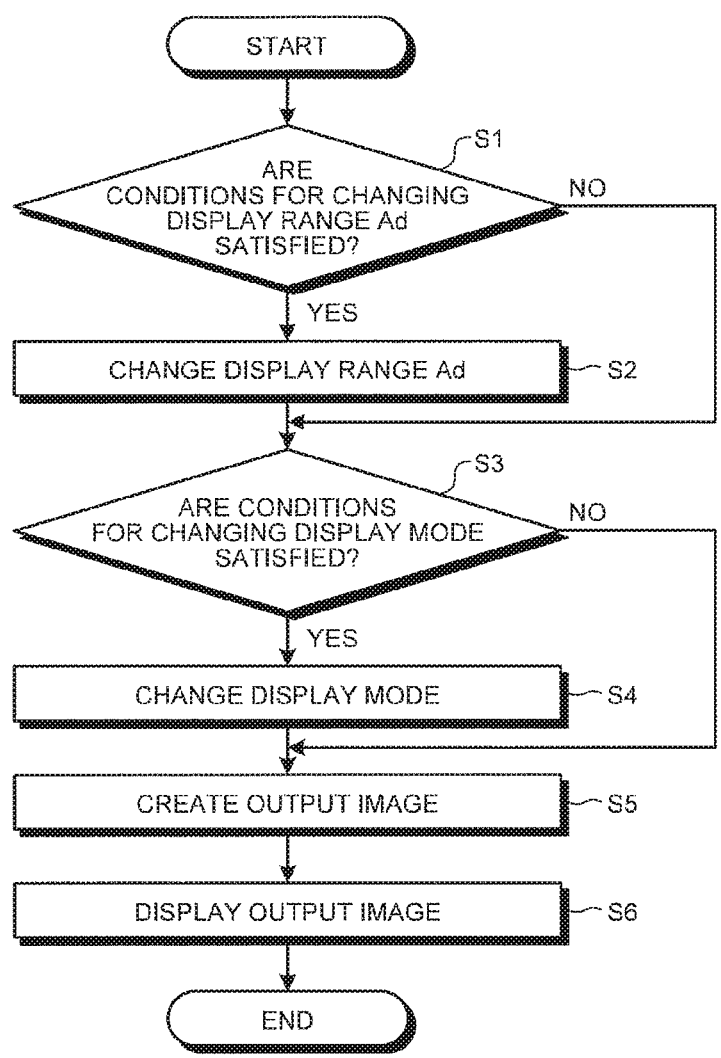
FIG. 11 is a flowchart of an exemplary process by the image display system the embodiment.

The image display system 100 according to the present embodiment can perform processing, for example, in a manner illustrated in FIG. 11. First, the ECU 11 acquires: the detection results, signals, or data from the non-contact measurement device 13, the steering angle sensors 14 and 15a, the GPS 16, the wheel speed sensor 17, the brake sensor 18a, the accelerator sensor 19, the torque sensor 20a, the shift sensor 21, and the direction indicator 22; the instruction signals, for example, from the operation input unit 24b; the detection results from the object detection unit 111; or the position of the vehicle 1 acquired by the vehicle position acquisition unit 113. Then, the ECU 11 determines whether the values of the acquired results, signals, and data satisfy the conditions for changing the display range Ad by comparing the values with their respective reference values (S1). When the conditions for changing the display range Ad are satisfied, the ECU 11 functions as the display range determination unit 115 so as to change the position or size of the display range Ad according to the conditions (S2). Next, the ECU 11 acquires the detection results, signals, or data from the non-contact measurement device 13, the steering angle sensors 14 and 15a, the GPS 16, the wheel speed sensor 17, the brake sensor 18a, the accelerator sensor 19, the torque sensor 20a, the shift sensor 21, and the direction indicator 22; the instruction signals, for example, from the operation input unit 24b; the detection results from the object detection unit 111; and the information indicating the vehicle condition. Then, the ECU 11 determines whether the values of the acquired results, signals, and data satisfy the conditions for changing the display mode by comparing the values with their respective reference values (S3). When the conditions for changing the display mode are satisfied, the ECU 11 functions as the display mode change unit 114 so as to change the display mode according to the conditions (S4). Note that the example of S4 will be described below. Then, the ECU 11 functions as the outside-vehicle image creation unit 110, the object detection unit 111, and the image creation unit 112 so as to create an output image Im corresponding to the set (changed) display mode and display range Ad (S5). In S5 an output image Im including an additional image can be created. The display control unit 11e controls the display unit 10a to display the created output image Im (S6).

In the present embodiment, as illustrated in FIGS. 2 and 9, the vehicle-body image Imi includes a plurality of lines Ll, a plurality of lines Lw, a line Lcl, and a line Lsw that correspond to the lower part (the floor and bottom end) of the vehicle body (the vehicle 1). The lines Ll extend in (correspond to) the vehicle longitudinal direction. The lines Lw extend in (correspond to) the vehicle width direction. The line Lcl extends in (corresponds to) the vehicle longitudinal direction, passing a specific position (for example, the center) in the vehicle width direction. The line Lsw extends in (corresponds to) the vehicle width direction, passing a specific position (for example, rear pillar position or rear wheel positions) in the vehicle longitudinal direction. The lines Ll and lines Lw are arranged in a frame form or a lattice pattern (grid pattern) to form a display area Ab corresponding to the lower part of the vehicle body. The display mode of the lines Lcl and Lsw is different from the display mode of the other lines Ll and Lw. Specifically, the width (thickness) of the lines Lcl and Lsw is larger than the width of the lines Ll and Lw. The luminance of the lines Lcl and Lsw is larger than the luminance of the lines Ll and Lw. The vehicle-body image Imi further includes lines Lv (portions Psr) extending in (corresponding to) the vehicle vertical direction at the side ends (the sides) or the rear end (the rear part) of the vehicle body. The vehicle-body image Imi further includes a plurality of display elements arranged with intervals which go narrower gradually toward the rear of the vehicle (the lines Ll and Lw in the example of FIG. 9). The characteristic of each of the lines helps the occupant (driver) easily recognize, for example, the position of the floor of the vehicle body, and also helps the occupant easily recognize, for example, a position in the vehicle body in the vehicle longitudinal direction or in the vehicle width direction. Furthermore, the occupant can recognize, for example, a position in the vehicle body at the height corresponding to the lower part of the vehicle body in the vehicle longitudinal direction or in the vehicle width direction. This helps the occupant easily recognize the position of the object B in the vehicle longitudinal direction or in the vehicle width direction more accurately than when the lines Lcl and Lsw are provided at a different height. The occupant can also easily recognize, for example, a vertical position in the vehicle body. Thus, the occupant can recognize, for example, the relative position to the object B or the size of the object B more accurately or more easily. The lines Ll, Lw, Lcl, Lsw, and Lv are one example of display elements. The display area Ab is an exemplary area. The lines Ll, Lw, Lcl, Lsw, and Lv, and the display area Ab are examples of a scale. Note that the lines Lv does not necessarily extend in the vertical direction, and can be inclined to the vertical direction. The lines (for example, the lines Lv) can be arranged at intervals along the other lines (for example, the lines Ll or Lw) as a scale.

Figure 12:
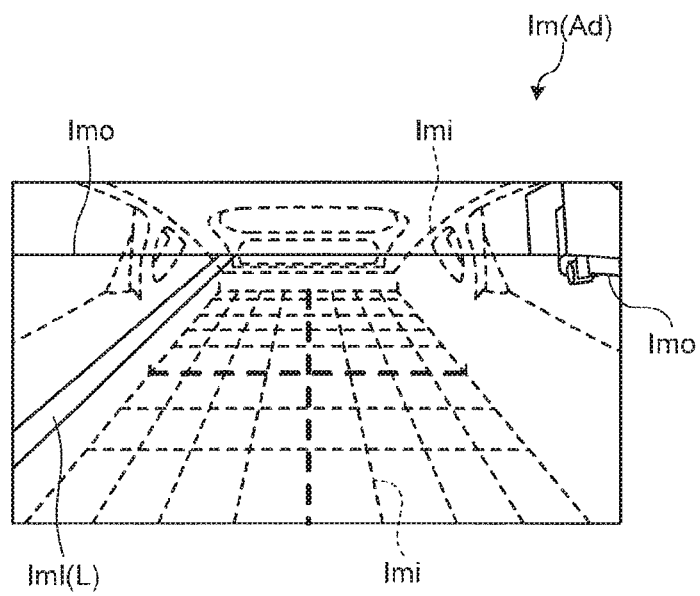
FIG. 12 is a diagram of an exemplary image (output image) before a lane change, displayed on the display device of the image display system of the embodiment.

FIGS. 12 and 13 illustrate the output images Im (the images displayed on the display unit 10a), for example, when the vehicle 1 makes a lane change to left. In FIG. 12 the vehicle 1 travels straight. In this situation, the display range Ad of the output image Im is narrow and directs approximately straight-rearward, and the transmittance α of the vehicle-body image Imi is 0 (zero). The display mode change unit 114 and the display range determination unit 115 acquire, as the information indicating the vehicle condition, the detection results, signals, or data from the respective units during a lane change of the vehicle 1, and change the transmittance α and the display range Ad when the values in the information satisfy preset conditions. In FIG. 13, for example, when obtaining, as the information indicating the vehicle condition, a signal (given by the driving operation by the driver) from the direction indicator 22 to indicate leftward motion, or the values (for example, the steering angle of each of the wheels 2, the position of the vehicle 1, or the speed of the vehicle 1) from the respective units dealing with the lane change of the vehicle 1 (for example, the steering angle sensors 14 and 15a, the wheel speed sensor 17, or the torque sensor 20a), the display range determination unit 115 enlarges (adjusts) the display range Ad of the output image Im laterally (in a right-left direction), and slides (moves, or adjusts) the display range Ad toward the changing lane (the direction indicated by the direction indicator, i.e., to left). Thus, the present embodiment helps the driver easily recognize, for example, the conditions around or outside the vehicle 1 in the travel direction. In FIG. 13, the display mode change unit 114 increases the transmittance α of the vehicle-body image Imi, for example, to about 0.6. Thus, according to the present embodiment, the vehicle-body image Imi is more see-through and viewable to the driver, therefore, the driver can more easily recognize the conditions around or outside the vehicle 1 in the travel direction. As illustrated in FIG. 14, when the object detection unit 111 detects the approaching object B (vehicle) in a predetermined distance on the rear left side of the vehicle 1, the display range determination unit 115 can determine (adjust) the display range Ad to include the image Imb of the approaching object B. In the example of FIG. 14, the display mode change unit 114 can set a higher transmittance α than the transmittance α when the object B is not detected. This helps the driver easily view the object B and recognize the distance to or relative position of the object B. In FIG. 14, for example, the additional image creation unit 116 adds a frame-like emphatic display Imf1 on the image Imb of the object B to surround the image Imb, and adds and superimpose a belt-like emphatic display Imf2 on an image Iml of a lane L on the road surface. Thus, the present embodiment helps the driver more easily view, for example, the conditions around or outside the vehicle 1 in the travel direction, or the object B. Note that the above control can be implemented in the same or like manner when the vehicle makes a lane change in the opposite direction (to right).

Figure 15:
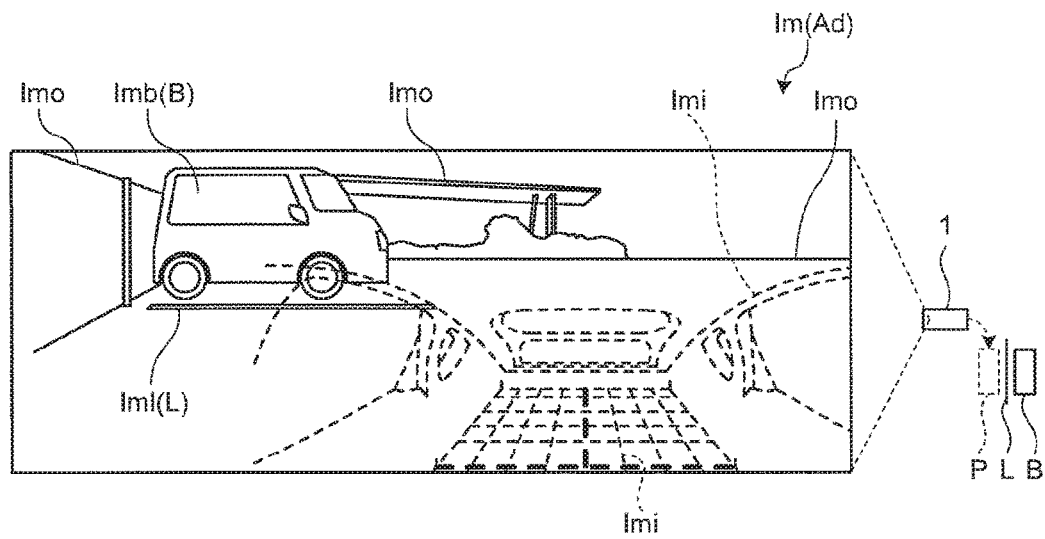
FIG. 15 is a conceptual diagram of an example of vehicle parking position and the image (output image) displayed at the position on the display device of the image display system of the embodiment before the parking starts.
Figure 16:
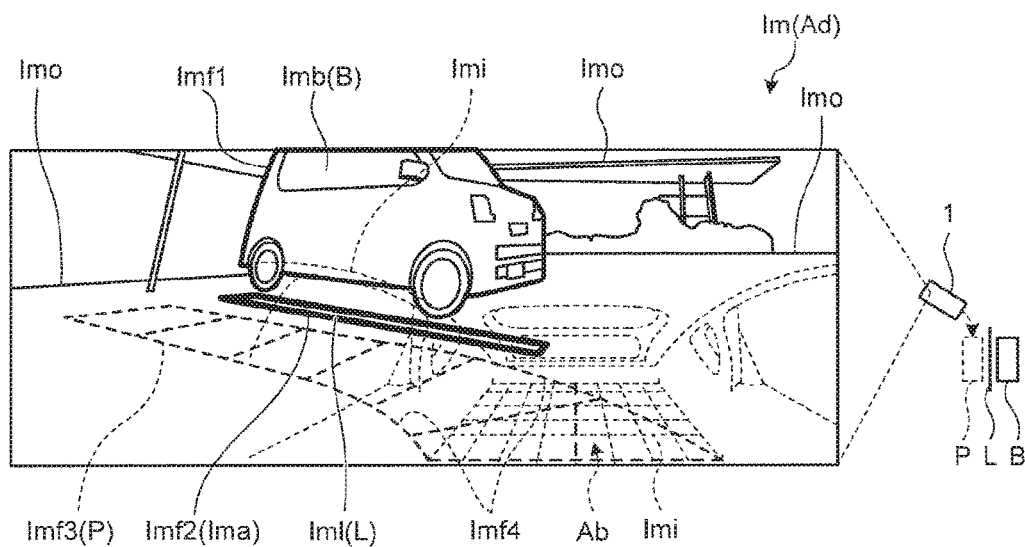
FIG. 16 is a conceptual diagram of an example of vehicle parking position and the image (output image) displayed at the position on the display device of the image display system of the embodiment before the vehicle reaches a target parking position.
Figure 17:
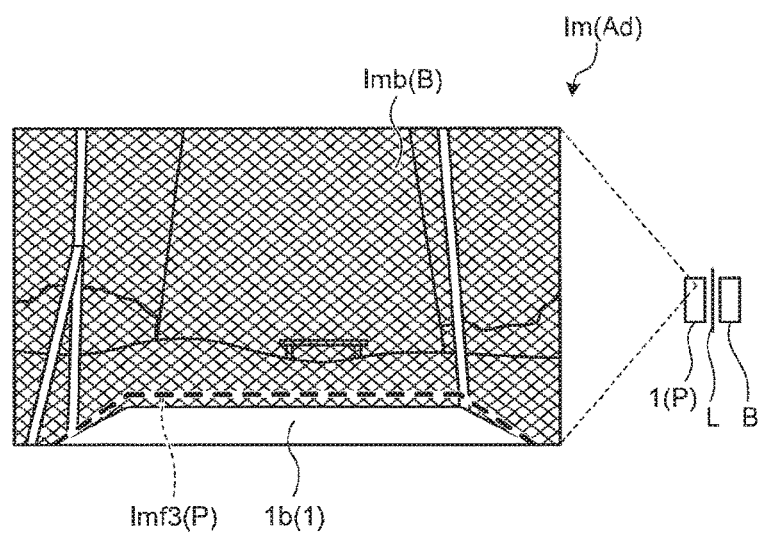
FIG. 17 is a conceptual diagram of an example of the position of the vehicle during parking and the image (output image) displayed at the position on the display device of the image display system of the embodiment when the vehicle moves closer to the target parking position than in FIG. 16.
Figure 18:
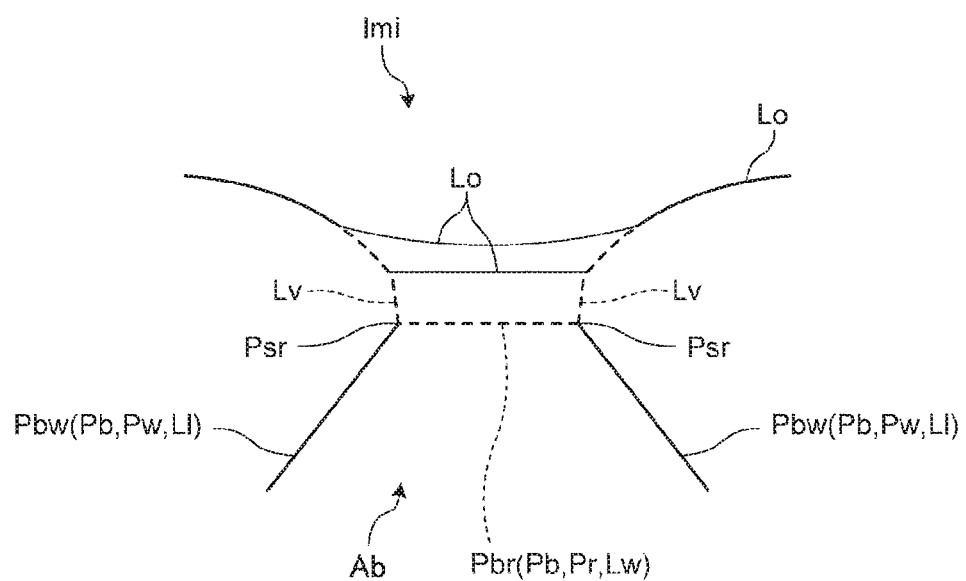
FIG. 18 is a diagram of another exemplary line drawing displayed on the display device of the image display system of the embodiment.
Figure 19:
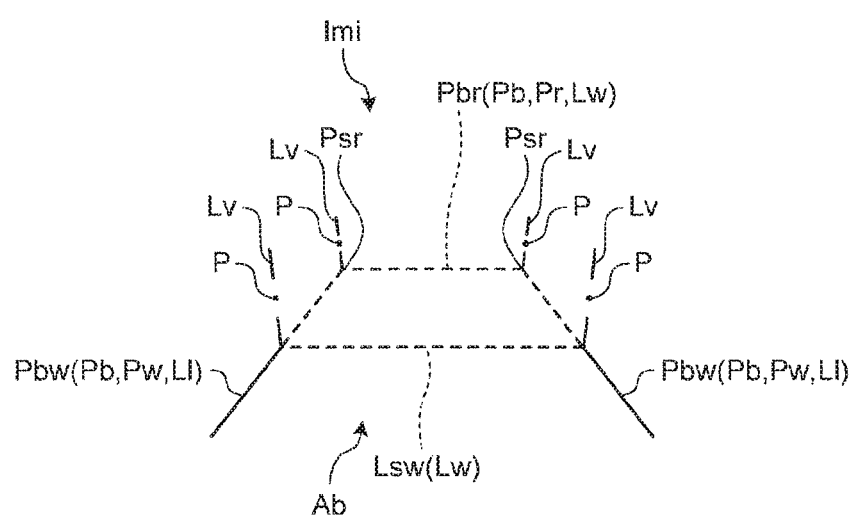
FIG. 19 is a diagram of another exemplary line drawing displayed on the display device of the image display system of the embodiment.

FIGS. 15 to 17 illustrate the output images Im (the images displayed on the display unit 10a) when the vehicle 1 is moving back to an estimated position to reach while turning to left for parking (in other words, parking into a garage), for example. In FIG. 15 the vehicle 1 moves straight. In this situation, the display range Ad of the output image Im is narrow and directs approximately straight-rearward, and the transmittance α of the vehicle-body image Imi is 0 (zero). The display mode change unit 114 and the display range determination unit 115 acquire, as the information indicating the vehicle condition, the detection results, signals, or data from the respective units dealing with the parking operation of the vehicle 1, and change the transmittance α and the display range Ad when the values in the information satisfy the preset conditions. In FIG. 15, for example, when acquiring, as the information indicating the vehicle condition, a signal (given by the driving operation by the driver) from the shift sensor 21 indicating the selection of the reverse (back) mode, or the values (for example, the steering angle of each of the wheels 2, the position of the vehicle 1, or the speed of the vehicle 1) from the respective units (for example, the steering angle sensors 14 and 15a, the wheel speed sensor 17, or the torque sensor 20a) dealing with the backward motion of the vehicle 1 at a predetermined speed or lower while turning, the display range determination unit 115 enlarges (adjusts) the display range Ad of the output image Im laterally (in a right-left direction), and slides (moves, or adjusts) the display range Ad in the vehicle turning direction (to left). Thus, the present embodiment helps the driver more easily recognize, for example, the conditions around or outside the vehicle 1 in the travel direction. In FIG. 16, the display mode change unit 114 increases the transmittance α of the vehicle-body image Imi, for example, to about 0.6. Thus, according to the present embodiment, the structure of the vehicle 1 including the pillars, roof, seats, and trim is see-through, which helps the driver more easily recognize the conditions around or outside the vehicle 1 in the travel direction. In FIG. 16, for example, the additional image creation unit 116 adds an emphatic display Imf1 on the image Imb of the detected object B to surround the image Imb; adds and superimpose a belt-like emphatic display Imf2 on an image Iml of a frame line L on the road surface; further adds an image Imf3 showing estimated positions to reach (for example, a target parking position P or a halfway position to the parking target position P) in a predetermined distance (path length) backward from a current position; and further adds a linear image Imf4 showing an estimated motion path from the estimated positions to reach or the steering angle, for example. The images Imf3 and Imf4 correspond to the display area Ab corresponding to the lower part of the vehicle body. For example, a part of the outer edges (for example, the side edges) of the images Imf3 and Imf4 may be drawn to match a part of the outer edges (for example, the side edges) of the display area Ab at the estimated position to reach. Alternatively, the two lines showing both side edges of the display area Ab and the two lines showing both side edges of the images Imf3 and Imf4 can be equidistance curves (parallel curves) from an estimated motion line of the vehicle 1 at a predetermined central position along the vehicle width (for example, the central position between the rear wheels 3R) on the road surface. The present embodiment helps the driver more easily recognize, for example, the conditions around or outside the vehicle 1 in the travel direction, the target parking position P, or the estimated position to reach (future motion path). The present embodiment helps the driver easily perceive, for example, an estimated motion path of the vehicle 1 from the vehicle-body image Imi including the display area Ab and the images Imf3 and Imf4 corresponding to the display area Ab. In FIG. 17, the vehicle 1 is approaching the target parking position P (the final estimated position to reach at which the vehicle is parked). In this approach, the display mode change unit 114 further increases the transmittance α in a second area A2 to one, for example. Thus, according to the present embodiment the vehicle-body image Imi is completely see-through, which helps the driver more easily view the image Imb of the object B (for example, an obstacle, a vehicle, or a person) around the vehicle, and recognize the distance to or relative position of the obstacle around the vehicle 1 (the object B) or the target parking position P. Furthermore, in the present embodiment, for example, the captured outside-vehicle image Imo includes a part of the body of the vehicle 1 (bumper in the example of FIG. 17). Thus, at the transmittance α of one, the driver more easily recognize the distance to or relative position of the obstacle around the vehicle 1 (the object B) or the target parking position P. Note that the above control can be implemented in the same or like manner for parking the vehicle while turning in the opposite direction (to right).

As described above, in the present embodiment, the outside-vehicle image creation unit 110 (the mirror image creation unit) creates mirror images of the rear and sides of the vehicle 1 based on the images captured with the image pickup unit 12. The image creation unit 112 (image superimposition unit) superimposes the vehicle-body image Imi (the line drawing) from which at least the lower part of the vehicle body is recognizable, on the mirror image created with the outside-vehicle image creation unit 110. Thus, the present embodiment enables the occupant to see the blind spots that are not seen in the interior mirror. For example, the vehicle-body image Imi is a thin line drawing. Thus, the vehicle-body image Imi is less likely to interfere with the outside-vehicle image Imo from which the occupant recognizes an outside view. Furthermore, the vehicle-body image Imi includes an image from which the occupant can recognize the lower part of the vehicle body. Thus, the occupant can easily recognize the size, shape, or regions of the vehicle body on a plan view. The occupant can easily recognize also, for example, the horizontal positional relationship with the object B outside the vehicle's interior based, for example, on the vehicle-body image Imi. The occupant can easily recognize also, for example, the height of the object B outside the vehicle's interior. Additionally, in the present embodiment, the vehicle-body image Imi is a line drawing from which the rear side and rear bottom of the vehicle body are recognizable. Thus, the occupant can easily recognize the relative position, for example, of the object B outside the vehicle's interior or the lane L to a rear corner of the vehicle body.

Additionally, in the present embodiment, the vehicle-body image Imi includes the parts Pbw (the first parts) showing the edges of the lower part of the vehicle body in the vehicle width direction, and the part Pbr (the second part) showing the rear edge of the lower part of the vehicle body in the vehicle longitudinal direction. Thus, the occupant can easily recognize, for example, the relative position of the vehicle body to the object B outside the vehicle's interior based on the edges of the lower part of the vehicle body in the vehicle width direction and the rear edge of the lower part of the vehicle body in the vehicle longitudinal direction. Additionally, in the present embodiment, the vehicle-body image Imi includes the parts Psr (the third parts) showing the rear edges of the side parts of the vehicle body in the vehicle longitudinal direction. Thus, the occupant can easily recognize, for example, the relative position of the vehicle body to the object B and the size of the object based on the side part and a rear corner of the vehicle body. Additionally, in the present embodiment, the lines Lv (the parts Psr) extend in the vehicle vertical direction. Thus, the occupant can easily recognize, for example, the side parts, rear part, or corners of the vehicle body. Furthermore, the occupant can easily recognize, for example, the relative position of the vehicle body to the object B outside the vehicle's interior and the size of the object.

Additionally, in the present embodiment, the vehicle-body image Imi includes the lines Ll and Lw (display elements) with intervals which gradually go narrower toward the rear of the vehicle. Thus, the occupant can easily recognize, for example, the depth of the vehicle body (a position in the vehicle longitudinal direction). Additionally, in the present embodiment, the vehicle-body image Imi includes the display element showing the center of the lower part of the vehicle body. Thus, the occupant can easily recognize, for example, the center of the vehicle body. Additionally, in the present embodiment, the vehicle-body image Imi includes the area Ab drawn in a frame form or a lattice pattern corresponding to the lower part of the vehicle body. Thus, the occupant can easily recognize, for example, the size, shape, or regions of the lower part of the vehicle body in a plan view. Additionally, in the present embodiment, the vehicle-body image Imi is drawn in a three-dimensional frame form. Additionally, in the present embodiment, the vehicle-body image Imi includes the outlines Lo (display elements) corresponding to the components of the vehicle body. Thus, the occupant can easily recognize, for example, the relative position of the vehicle body to the object B outside the vehicle's interior and the size of the object based on a component of the vehicle body.

Exemplary Variations of Vehicle-Body Image (Line Drawing)

FIGS. 18 to 22 illustrate exemplary variations of the vehicle-body image Imi. The examples of FIGS. 18 and 19 include a plurality of lines with different surface densities. Specifically, the lines Ll, Lw, and Lv in the parts (including the parts Pbr, and Psr) corresponding to the rear part, lower part or corners of the vehicle body (the vehicle 1) have a lower surface density than the surface density of the other parts. Specifically, the lines Ll, Lw, and Lv showing the rear part are dashed lines and the others are solid lines. This helps the occupant easily see, for example, the object B outside the vehicle's interior through the lines with a low surface density. Using a narrower line, a thinner line, or a dashed line at wider intervals than the other lines can also bring about the similar effect. Note that, in the example of FIG. 19, points P are included in the lines. Using the points P can also bring about the similar effect.

Figure 20:
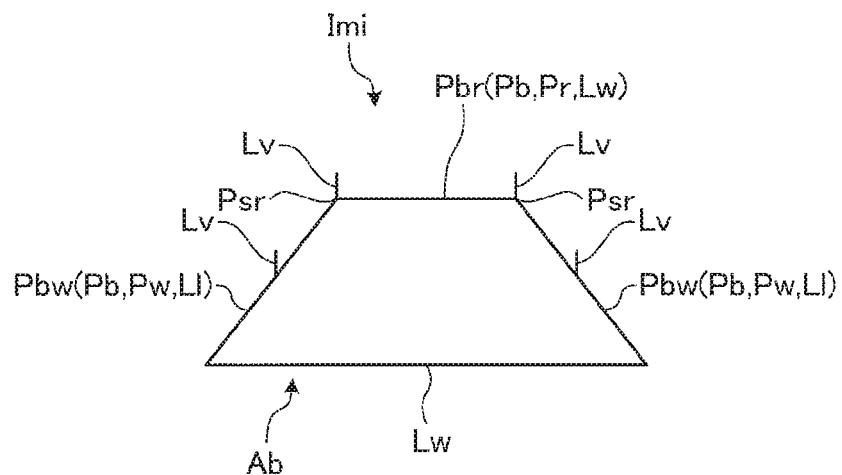
FIG. 20 is a diagram of another exemplary line drawing displayed on the display device of the image display system of the embodiment.
Figure 21:
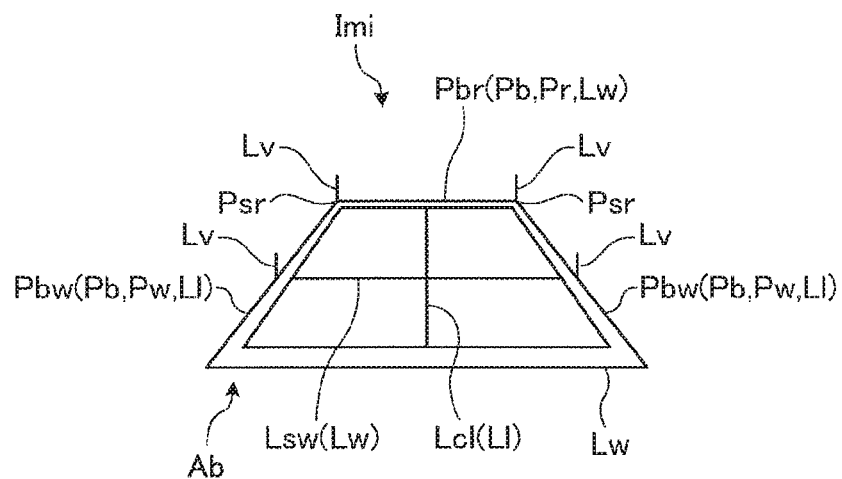
FIG. 21 is a diagram of another exemplary line drawing displayed on the display device of the image display system of the embodiment.
Figure 22:
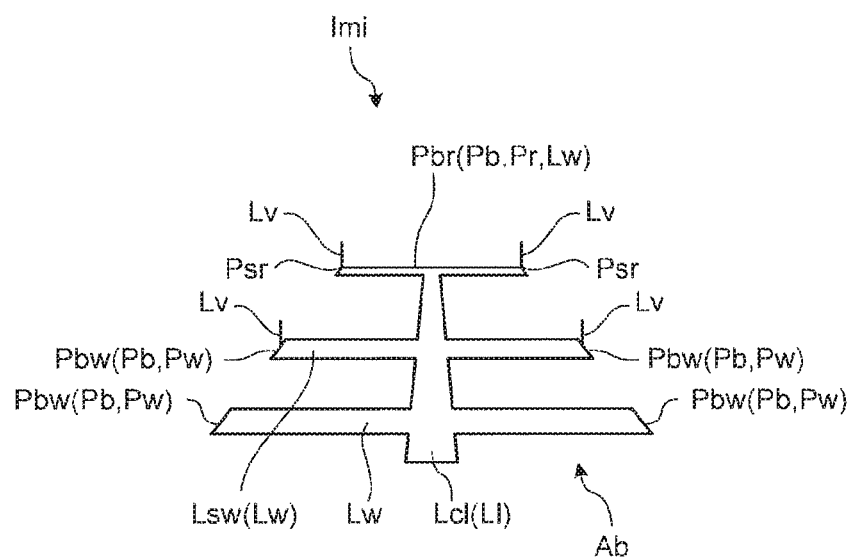
FIG. 22 is a diagram of another exemplary line drawing displayed on the display device of the image display system of the embodiment.
Figure 23:
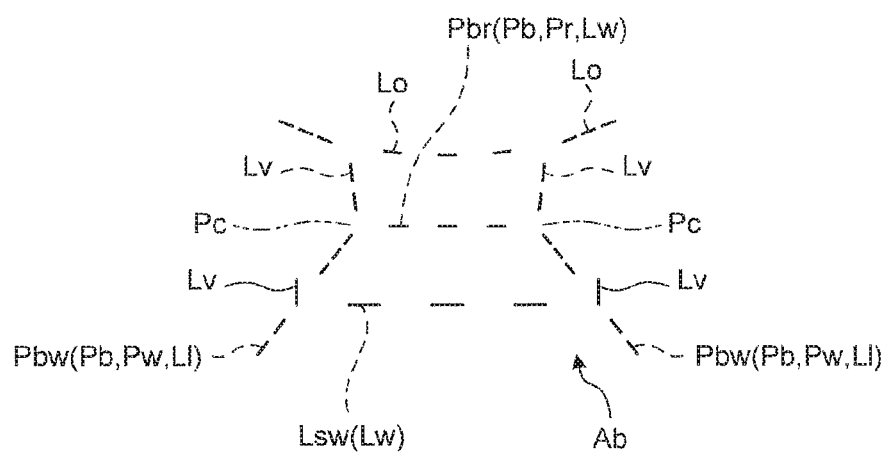
FIG. 23 is a diagram of another exemplary line drawing displayed with the display device of the image display system of the embodiment.

In FIG. 20, the display area Ab corresponding to the lower part of the vehicle body is formed not in a lattice pattern but in a quadrangular frame shape. In FIG. 21, the outer periphery (the edge) of the display area Ab is larger in width than the other parts. In FIG. 22, the display area Ab is a skeleton of relatively wide lines. Such vehicle-body images Imi can also bring about the similar effect to that in the embodiment described above. In FIGS. 21 and 22, the lines Ll and Lw (display elements) gradually go narrower in width toward the rear part of the vehicle body. Thus, the occupant can easily recognize the depth from the width of the lines. In the example of FIG. 22, each of the parts Pbw (the first parts) showing the edges of the lower part of the vehicle body in the vehicle width direction is the edges of at least one (plural in FIG. 22) of the lines Lw. In such a display mode, namely, by the edge of the line the occupant can also recognize the edges in the vehicle width direction or in the vehicle longitudinal direction. In the example of FIG. 23, there is no display element provided at the rear edges (corners) Pc of the sides of the vehicle body in the vehicle longitudinal direction. In such a display mode the occupant can also recognize (estimate) a specific region from the other lines Ll, Lw, and Lv. Without the display element, the occupant can more easily recognize the object B outside the vehicle's interior.

The embodiments of the present invention have been described as examples above. The embodiments and exemplary variations are only examples. It is not intended that the scope of the invention is limited to the embodiments and exemplary variations. The embodiments and exemplary variations can be implemented in other various forms and can variously be omitted, replaced, combined, or changed without departing from the gist of the invention. The configurations or shapes of the embodiments and exemplary variations can partially be exchanged and implemented. Furthermore, the specifications (the structure, type, direction, shape, size, length, width, thickness, height, number, placement, position, or material) of each configuration or formation can appropriately be changed and implemented.

The display unit 10a can be a device that projects an image, for example, on the windshield or a screen in the vehicle's interior, or can be a display panel provided on the dashboard (cockpit module, instrument panel, or fascia, not illustrated) or the center console box at the front of the vehicle's interior.

The signal given by the driving operation by the driver can be a signal given by the operation to an operation unit that performs driving operation, including the steering wheel, shift switch, brake pedal, clutch pedal or accelerator pedal in addition to the above-described direction indicator 22 and shift lever. The change (variation or adjustment) of the display mode in response to the operation to the operation unit can be variously set. For example, in response to the operation of the brake pedal, the display mode can be changed (adjusted) (for example, the transmittance α is increased), or the display range Ad can be enlarged.

EXPLANATIONS OF LETTERS OR NUMERALS

1 VEHICLE (VEHICLE BODY)
10a DISPLAY UNIT (DISPLAY DEVICE)
11 ECU (IMAGE DISPLAY CONTROL DEVICE)
11e DISPLAY CONTROL UNIt
12 IMAGE PICKUP UNIT
12R IMAGE PICKUP UNIT (FIRST IMAGE PICKUP UNIT)
12S IMAGE PICKUP UNIT (SECOND IMAGE PICKUP UNIT)
100 IMAGE DISPLAY SYSTEM
110 OUTSIDE-VEHICLE IMAGE CREATION UNIT (MIRROR IMAGE CREATION UNIT)
112 IMAGE CREATION UNIT (IMAGE SUPERIMPOSITION UNIT)
Ab DISPLAY AREA (AREA)
Imi VEHICLE-BODY IMAGE (LINE DRAWING)
Lcl LINE (DISPLAY ELEMENT)
Lo OUTLINE (DISPLAY ELEMENT)
Pbw PART (FIRST PART)
Pbr PART (SECOND PART)
Psr PART (THIRD PART)

The invention claimed is:

1. An image display control device comprising:
a CPU configured to:
create a mirror image of an area behind and on a side of a vehicle body based on an image captured with a camera provided on the vehicle body;
superimpose a line drawing from which at least a lower part of the vehicle body is recognizable, and the mirror image created by the CPU; and
control a display device to display an image created by superimposing the mirror image and the line drawing by the CPU, wherein
the lower part of the vehicle body is a plane that is defined by a floor of the vehicle body, and
the line drawing includes an area showing a plane representing a vehicle floor in lattice pattern, and
the lattice pattern is superimposed on the mirror image at a height of the vehicle floor as viewed from a viewpoint at an interior of the vehicle body.

2. The image display control device according to claim 1, wherein the line drawing is a line drawing from which at least a side part and a bottom part of a rear part of the vehicle body are recognizable.

3. The image display control device according to claim 1, wherein the line drawing includes a first part showing an edge of the lower part of the vehicle body in a vehicle width direction, and a second part showing a rear edge of the lower part of the vehicle body in a vehicle longitudinal direction.

4. The image display control device according to claim 1, wherein the line drawing includes a third part showing a rear edge of a side of the vehicle body in the vehicle longitudinal direction.

5. The image display control device according to claim 1, wherein the line drawing includes a plurality of lines with different surface densities.

6. The image display control device according to claim 1, wherein the line drawing includes a line extending in a vehicle vertical direction on the side part or rear part of the vehicle body.

7. The image display control device according to claim 1, wherein the line drawing includes display elements, and either a width or an interval of the display elements becomes gradually narrower toward the rear of the vehicle body.

8. The image display control device according to claim 1, wherein the line drawing includes a display element showing a center of the lower part of the vehicle body.

9. The image display control device according to claim 1, wherein the line drawing is in a three-dimensional frame form.

10. The image display control device according to claim 1, wherein the CPU is configured to adjust a display range of the superimposed mirror image and the line drawing in accordance with a vehicle condition, and
when the vehicle makes a lane change or the vehicle is moving back while turning, the display range is enlarged.

11. The image display control device according to claim 1, wherein the CPU is configured to determine a display mode of the line drawing in accordance with a vehicle condition, and
when the vehicle makes a lane change or the vehicle is moving back while turning, a transmittance of a vehicle-body image included in the line drawing is increased, the vehicle-body image representing a frame-like outline of the vehicle body.

12. The image display control device according to claim 1, wherein the lattice pattern is formed by lines extending in the vehicle longitudinal direction and lines extending in the vehicle width direction.

13. The image display control device according to claim 1, wherein
the CPU is configured to adjust a display range of the superimposed mirror image and the line drawing in accordance with a vehicle condition and determine a display mode of the line drawing in accordance with a vehicle condition, and
when the vehicle makes a lane change or the vehicle is moving back while turning, the display range is enlarged and a transmittance of a vehicle-body image included in the line drawing is increased, the vehicle-body image representing a frame-like outline of the vehicle body.

14. An image display system comprising:
a first camera that is provided on a vehicle body and captures an image of an area behind the vehicle body;

a second camera that is provided on the vehicle body and captures an image of an area on a side of the vehicle body;
a display device; and
an image display control device that includes:
a CPU configured to:
    create a mirror image of an area behind and on the side of the vehicle body based on the images captured with the first camera and the second camera;
    superimpose the mirror image and a vehicle-body image from which at least a lower part of the vehicle body is recognizable; and
    control the display device to display an image created by superimposing the mirror image and the vehicle-body image by the CPU, wherein
the lower part of the vehicle body is a plane that is defined by a floor of the vehicle body, and
the line drawing includes an area showing a plane representing a vehicle floor in lattice pattern, and
the lattice pattern is superimposed on the mirror image at a height of the vehicle floor as viewed from a viewpoint at an interior of the vehicle body.

* * * * *